United States Patent [19]

Director

[11] E Patent Number: Re. 33,328

[45] Reissued Date of Patent: Sep. 11, 1990

[54] WRITE PROTECT CONTROL CIRCUIT FOR COMPUTER HARD DISC SYSTEMS

[76] Inventor: Dennis Director, 2720 Hawthorne La., Wilmette, Ill. 60091

[21] Appl. No.: 305,851

[22] Filed: Feb. 2, 1989

Related U.S. Patent Documents

Reissue of:

[64] Patent No.: 4,734,851
Issued: Mar. 29, 1988
Appl. No.: 723,880
Filed: Apr. 17, 1985

[51] Int. Cl.[5] ..... G06F 13/12

[52] U.S. Cl. ..... 364/200; 360/60; 360/69

[58] Field of Search ..... 364/200, 900, 300; 360/60, 133, 137, 97.01, 132, 99.01, 99.02, 122, 69, 134

[56] References Cited

U.S. PATENT DOCUMENTS

| | | | |
|---|---|---|---|
| 4,210,959 | 6/1980 | Wozniak | 364/200 |
| 4,290,088 | 9/1981 | Beecroft | 360/66 |
| 4,298,934 | 11/1981 | Fischer | 364/200 |
| 4,412,260 | 10/1983 | Stricklin et al. | 360/97 |
| 4,466,024 | 8/1984 | Liu | 360/60 |
| 4,479,154 | 10/1984 | Muramatsu | 360/69 |
| 4,489,380 | 12/1984 | Carey et al. | 364/200 |
| 4,511,936 | 4/1985 | Sims, Jr. | 360/69 |
| 4,513,392 | 4/1985 | Shenk | 364/900 |
| 4,521,820 | 6/1985 | Fann | 360/133 |
| 4,535,404 | 8/1985 | Shenk | 364/200 |
| 4,541,019 | 9/1985 | Precourt | 360/15 |
| 4,618,060 | 10/1986 | Tarter | 206/444 |
| 4,675,756 | 2/1986 | Saitoh et al. | 360/71 |

OTHER PUBLICATIONS

Hardware Maintenance Manual, vol. 2, published by Control Data Corporation, in Jan., 1984, in the U.S., pp. i, ii, 1-1, 1-2, 1-22 through 1-30.

*Primary Examiner*—David L. Clark
*Attorney, Agent, or Firm*—Welsh & Katz, Ltd.

[57] ABSTRACT

A write protect system prevents inadvertent attempts to write data into a permanent memory storage device (such as a disc drive) containing valuable data that might be destroyed by such a write attempt. The write protect system includes a controller coupled to at least one memory storage device via information transfer busses and a control data bus. The controller sends signals for writing data into selected ones of memory devices. A circuit is coupled into the control data bus for monitoring signals transmitted thereover. Responsive to the monitoring circuit, access is barred to preclude writing into a specific one of the memory devices whereby data may not be accidentally written into the specific memory. The barring is cancelled if a specific action is taken whereby data may be deliberately written into a specific memory.

3 Claims, 2 Drawing Sheets

WRITE PROTECT CONTROL CIRCUIT FOR COMPUTER HARD DISC SYSTEMS

Matter enclosed in heavy brackets [ ] appears in the original patent but forms no part of this reissue specification; matter printed in italics indicates the additions made by reissue.

This invention relates to control circuits for computers and computer-like equipment and, more particularly, to write protection for such equipment having a plurality of means for storing data.

The basic problem which the invention addresses is one of preventing accidental interference with previously stored data responsive to an incorrectly attempted storage of data in the wrong memory of a computer. For example, suppose that valuable data is already permanently stored on a first and hard disc. Also, suppose that someone wants to temporarily enter new data on a second and floppy disc. Both discs are accessed by the computer in a similar manner, but by using slightly different memory codes. There always is a chance that human or equipment error might cause the computer to be operated in a manner which alters or destroys the valuable permanent data stored on the first or hard disc, instead of entering the new data on the second or floppy disc.

Thus, there is a need to "write protect" the first disc, which means that a circuit is activated which absolutely bars access to the first disc, during the writing of data onto the second disc. If there is a need to enter data in the first or protected disc, the write protect circuit must be off. That is a deliberate act which will not be accidentally undertaken.

More particularly, for many years, large main frame computers have used secondary memories in the form of tape drives and disc drives. Both of these types of devices often have two useful switches for giving write protect and online control. Since most computers have several tape or disc drives, it is not unusual to be performing an operation which is reading from one device and writing into another device. To guard against accidents, the drive for the device from which data is being read is "write protected" responsive to the throwing of a switch on the front of a drive for the read device. A similar safeguard is a switch labeled "online" which may be turned off to completely detach that read device from the computer.

When floppy disc technology was introduced for mini and micro computers, the write protect device took the form of a notch in the floppy disc itself. The drive may optically sense whether or not the notch is covered and, therefore, decide if the disc is "write protected." Again, this technique guards against accidents in the nature of over-writing valuable data.

Accordingly, an object of the invention is to provide new and improved means for giving write protection to a disc drive. Here, an object is to provide simple and low cost equipment which may be added onto virtually any computer-like equipment. In this connection, an object is to enable the inventive write protect circuit to be installed on almost any computer or similar device without requiring any modification thereof.

Another object of the invention is to provide a write protect device for personal and business computers which cannot be overriden through accident.

In keeping with an aspect of the invention, these and other objects are accomplished by a simple logic circuit which observes when write signals addressed to a particular device appear on a data bus. If the write signals appear at a time when the particular device is enabled to write, a write request or gate signal is passed so that the writing may be accomplished. If the write signals appear on the data bus at a time when the particular device is not enabled, the write request or gate signal is inhibited and the drive may not write any data. Therefore, the valuable data already stored on the protected device cannot be disturbed.

A preferred embodiment of the invention is shown in the attached drawings, wherein.

Figure 1:
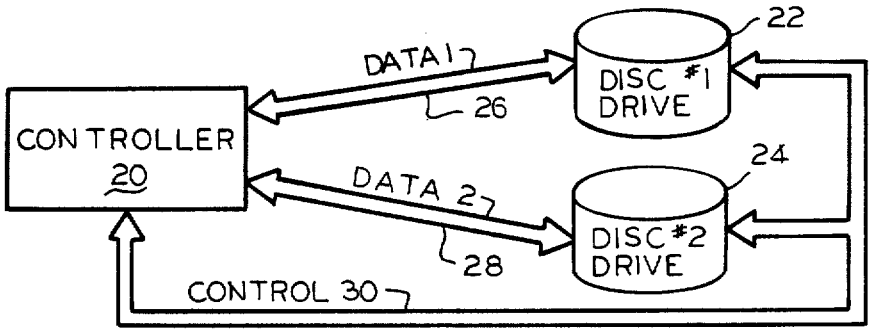
FIG.1 (PRIOR ART)
FIG. 1 is a block diagram of a prior art system, including a computer or computer-like device, having two associated disc drives.

The system of FIG. 1 includes a controller 20, which may be any suitable device. By way of example, a pair of disc drives 22, 24 are shown as being connected to the controller 20 via commercially available data busses 26, 28 for the transmission of information signals. The disc drives 22, 24 are also connected to the controller 20 via a common control bus 30. All of the busses are two-way data transfer devices.

For convenience of this description, it is assumed that both of the drives 22 and 24 are Winchester fixed disc systems, although the invention may be applied to any other suitable equipment. The controller 20 and drives 22, 24 are associated with a small personal or business computer. The devices and busses use industry standards for making interface connections. If some other drive, for some other computer or interface standard is used, the principles explained herein may be easily modified to fit those devices or standards.

According to the invention (FIG. 2), the control data bus 30 is disconnected from the controller 20 and connected to a monitoring means in the form of write protect device 32. A new control data bus 34 is connected between the controller 20 and the write protect monitoring device 32. All other equipment in FIG. 2 remains the same as those shown in FIG. 1. The write protect monitoring device 32 enables data which is sent over information data bus 26 to be written in disc drive device 22, unless device 32 is first activated in a manner which disables such writing.

Figure 3:
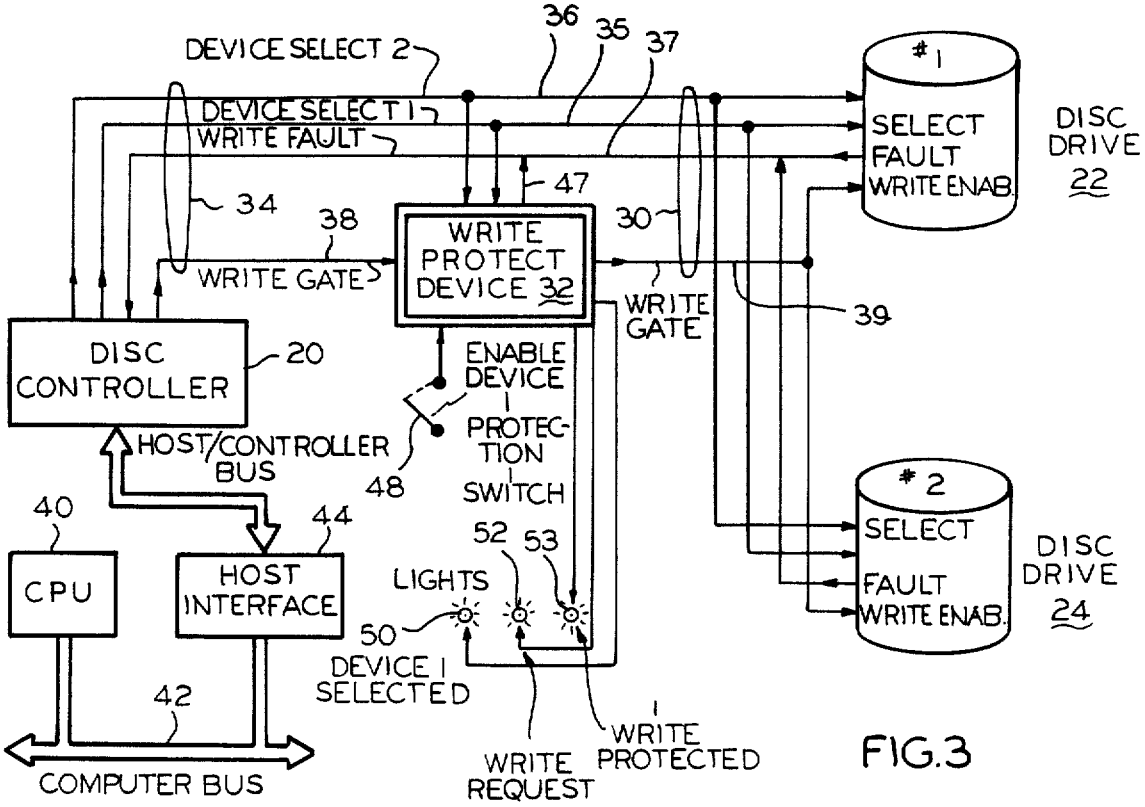
FIG. 3 is a block diagram of the interconnections between the inventive device and two disc drives.

The pertinent ones of the specific interconnections provided by the two control busses 30, 34 are shown in FIG. 3. While these connections are shown separately from the circuit 32, they are preferably internally wired so that the connections are made by simply connecting a data bus into each of two opposite sides of a box, so to speak.

The central processor of a business or personal computer 40 is coupled to a computer bus 42 which may extend to any suitable equipment, which may be used for any suitable purpose. A host interface 44 is used to connect a controller 20 to the computer bus 42. All of these items 40–44 and 20 (and anything else connected to bus 42) are standard commercial items.

The control data bus 34 includes a "device select 1" wire 35 which selects disc drive device 22 and a "device select 2" wire 36 which selects disc drive device 24. One, and only one, of these device select wires is activated at any given time; therefore, only one of the disc drive devices may be activated at any given time. The fault would occur if the "enable device 1 protection" switch 48 is activated at a time when the intention is to enter data in device 22.

The "write fault" wire 37 is one which is activated by either of the devices 22, 24 if, for any reason, it cannot accept the data being sent to it. The write protect circuit 32 may simulate this write fault signal. Regardless of its source, an appearance of a fault signal on the "write fault" wire 37 informs the controller 20 that the data was not written as requested.

Figure 2:
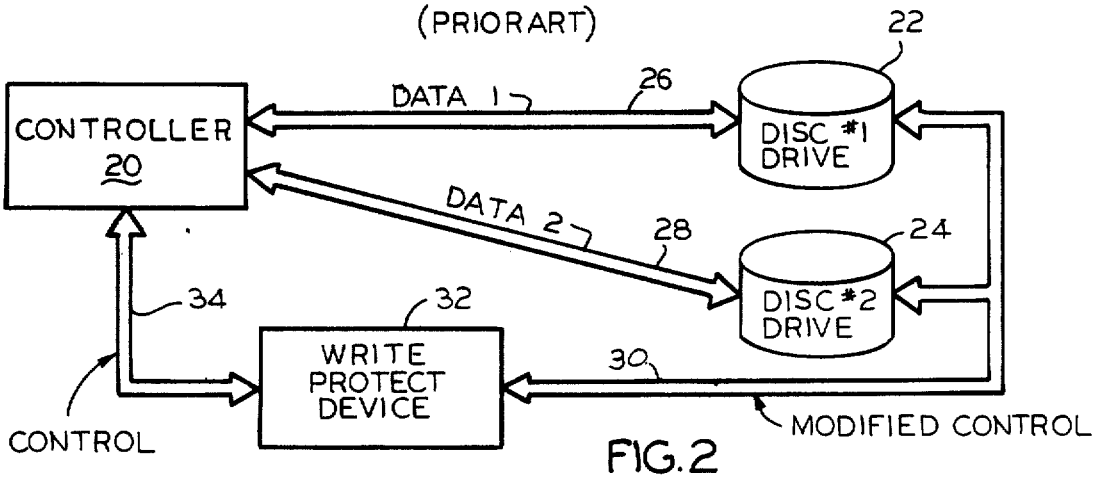
FIG. 2 is the same system with the inventive write protect device installed in a control bus.

The "write gate" wire 38, 39 carries an enable signal which causes the selected disc drive to write. Thus, for example, if the select wire 35 is activated, disc drive 22 is enabled and placed on standby. When a signal also appears on the "write gate" wire 38, 39, the disc drive 22 records whatever information is then being sent over information data bus 26 (FIG. 2).

The write protect device 32 is coupled to monitor the signals appearing on the device select wires 35, 36. The write gate signals on wire 38 pass through write protect device 32 to wire 39, If there is a mistaken effort to write into the wrong disc drive at a time when it is protected, the signal on the write gate wire 38 is not passed through write protect circuit 32 to wire 39, and a signal is applied at 47 to the write fault wire 37.

A manual "enable device 1 protection" switch 48 is provided on the device 32. This switch is operated whenever there is a need to protect or unprotect device 22. Another switch "enable device 2 protection" might have been provided if protection was required for device 24.

Three lamps (which may be LED's) 50–52 visually indicate when the protected device is selected, when it is protected, and when an effort is being made to write into it. These lamps provide for human supervision over the write operation.

Figure 4:
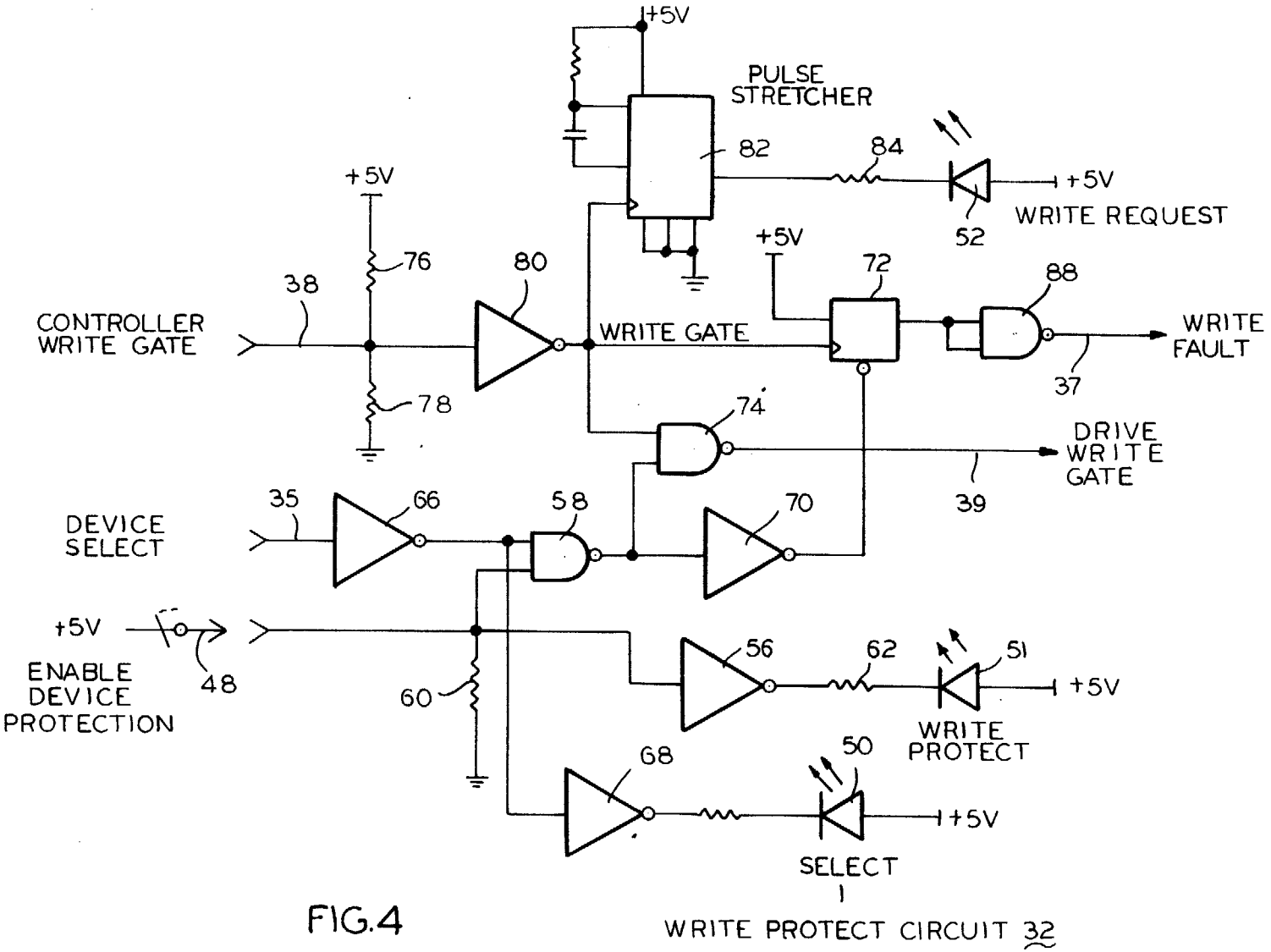
FIG. 4 is a logic circuit diagram of the inventive device.

The details of the write protect circuit 32 are shown in FIG. 4. If the circuit is to be activated, the "enable device 1 protection" switch 48 is activated. Responsive thereto, the inverter 56 is activated to light LED 51, which indicates that the associated disc drive device is protected. Also, responsive to the closure of switch 48, the lower input of a two input NAND gate 58 is marked, without immediate effect. Resistor 60 provides a bias voltage and resistor 62 limits current.

When the disc controller 20 attempts to write into the protected disc drive device 22, a signal appears on the "device select 1" wire 35 and passes through the inverter 66 to the upper input of NAND gate 58. There is a coincidence with the signal from switch 48 so that NAND gate 58 conducts. The invention device is now in the so-called "protecting mode" for device 1. Also, responsive to the output of inverter 66, a signal is fed [throught] *through* inverter 68 to light LED 50, thus indicating that the protected device 22 has been selected.

The output of NAND gate 58 passes through inverter 70 thereby removing the inhibit from [the] *a* latch circuit 72, allowing the transmission of a wire fault signal. The output of NAND [gat] *gate* 58 also applies a disable signal to a guard means in the form of NAND gate 74. The circuit is now ready to intercept any write gate signal and generate a write fault.

As the undesired write operation continues, a signal appears on the "write gate" wire 38. Resistors 76, 78 form a voltage divider for setting an input bias for inverter 80. The write gate signal on wire 38 activates the inverter 80 to change its state.

The output of inverter 80 passes to the upper input of NAND gate 74. Since the output of NAND gate 58 is disabling the activation of NAND gate 74, the "drive write gate" signal is not asserted on wire 39 and does not enable writing on disc drive device 22.

The output of inverter 80 also triggers a pulse generating circuit 82 to light LED 52 which indicates that a write request has occurred. Resistor 84 is current limiting. Also, responsive to the output of inverter 80, the flip-flop 72 is activated and a fault signal is transmitted through an inverter 88 to the "write fault" wire 37. From FIG. 3, a signal on the fault wire informs the disc controller that the write operation in progress has failed. At the end of the wire sequence, the disc controller device 20 de-asserts the "device 1 select" signal on wire 35 which resets the flip-flop 72 by way of the path 35, 66, 58, 70 thereby terminating the "write fault" signal on wire 37.

Thus, when the switch 48 is closed, any information transmitted over the data bus 26 (FIG. 2) is not written into the protected device 22.

If device 24 is selected (a non-protected device), there is no signal on wire 35, and inverter 66 and NAND gate 58 are not activated. Inverter 70 does apply an inhibit signal to flip-flop 72 for disabling the generation of write fault conditions. If a write gate signal appears at input 38, inverter 80 is activated, pulse generator 82 operates and LED 52 lights. The output of inverter 80 is applied to the upper input of NAND gate 74 coincidental with an enable on the lower input thereby causing NAND gate 74 to assert a "drive write gate" signal on wire 39 to device 24. Thus, device 24 is write enabled and unaffected by the write protected state of device 22.

If the circuit 32 is not to be activated, switch 48 is not activated. When the switch 48 is not activated, the bias voltage caused by resistor 60 disables [AND] *NAND* gate 58. Independent of the presence of any select signals, the circuit is now said to be in "non-protecting mode." The always disabled NAND gate 58 (i.e. when switch 48 is open) enables NAND gate 74. Therefore, the presence of a "controller write gate" at wire 38 always creates a "drive write gate" signal at wire 39. The inactive output of NAND gate 58 also passes through inverter 70 to reset flip-flop 72 for preventing it from generating a "write fault" at wire 37.

From the foregoing, it is apparent that nothing can be written into the protected device unless a conscious effort is made to unblock the access to it. The protection maybe added quickly and easily, to almost any existing system, by plugging the device into data busses 38, 39.

Those who are skilled in the art will readily perceive how to modify the invention. Therefore, the appended claims are to be construed to cover all equivalent structures which fall within the true scope and spirit of the invention.

The invention claimed is:

1. A write protect system comprising:

a computer having at least one memory means, said memory means including a hard disc drive, a controller coupled to said hard disc drive by at least one information transfer bus and at least one control data bus, means for selecting said hard disc drive for operation by sending a signal from said controller to said hard disc drive on a first wire in said control data bus, means for enabling said hard disc drive to erase data in said hard disc drive by sending a signal from said controller to said hard disc drive on a second wire in said control data bus, circuit means coupled to said control data bus for monitoring signals transmitted on said first wire in said control data bus, guard means for selectively interrupting the signal from said enabling means on the second wire to prevent said hard [disk] *disc* drive from being enabled to erase data thereby preventing data from being [accidentially] *accidentally* erased from said hard disc [drive] *drives*, said guard means including a plurality of logic devices, at least one of said logic devices having an output coupled to said hard disc drive and at least one of said logic devices having an input coupled to said enabling means by connection to said second wire, and a manual switch coupled to said logic devices for controlling the logic states of said logic devices to enable gating of the signal from the enabling means responsive to the manual switch, whereby data cannot be erased from said hard disc drive when said manual switch is in a selected write protect state.

2. The system of claim 1 comprising means for indicating to said controller that a fault has occurred and said hard disc drive has not responded to [said selection means or] said enabling means, said fault indicating means sending a signal from said hard disc drive to said controller on a third wire in said control data bus, and means for creating a fault indication when said enabling means is enabled from said controller and said guard means interrupts said enabling means, preventing said hard disc drive from being enabled.

3. The system of claim 1 wherein said guard means includes a first gate having first and second inputs and an output, the first of said input being connected to said manual switch, the second of said inputs being coupled to said first wire, and said output being connected to a first input of a second gate, said second gate also having a second input and an output, said second input of said second gate being connected to said second wire to receive signals from said controller, said output of said second gate being connected to said second wire to send signals to said hard disc drive, said first gate producing a first selected output when said manual switch is in said write protect state and said hard disc drive is selected by said select means, said second gate producing a second selected output when said first gate [produces] *is not producing* said first selected output [, regardless of whether signals are sent from said controller on said second wire] *and signals are sent from said controller on said second wire.*

* * * * *